(12) United States Patent
Peterlini

(10) Patent No.: US 12,187,007 B2
(45) Date of Patent: Jan. 7, 2025

(54) DEVICE FOR DISPENSING A CUSHIONING AND PACKAGING ELEMENT, METHOD FOR PRODUCING THE ELEMENT, AND CUSHIONING ELEMENT AND CONSUMABLE USED TO PRODUCE SAID ELEMENT

(71) Applicant: Jacky Peterlini, Annecy le Vieux (FR)

(72) Inventor: Jacky Peterlini, Annecy le Vieux (FR)

( * ) Notice: Subject to any disclaimer, the term of this patent is extended or adjusted under 35 U.S.C. 154(b) by 101 days.

(21) Appl. No.: 17/706,399

(22) Filed: Mar. 28, 2022

(65) Prior Publication Data

US 2022/0219422 A1 Jul. 14, 2022

Related U.S. Application Data

(63) Continuation of application No. 16/472,061, filed as application No. PCT/FR2017/053739 on Dec. 20, 2017, now Pat. No. 11,331,873.

(30) Foreign Application Priority Data

Dec. 22, 2016 (FR) ...................................... 1663234

(51) Int. Cl.
*B31D 5/00* (2017.01)
*B32B 27/10* (2006.01)
*B65D 81/05* (2006.01)

(52) U.S. Cl.
CPC ............ *B31D 5/0047* (2013.01); *B32B 27/10* (2013.01); *B65D 81/05* (2013.01); *B31D 2205/0047* (2013.01)

(58) Field of Classification Search
CPC .......... B31D 2205/0047; B31D 5/0047; B31D 5/006; B31D 5/0043; B31D 5/00; B31D 5/04; B32B 27/10; B65D 81/05; B65D 81/03; B65D 81/09; B65D 65/00; B65D 65/38; Y10S 493/904; Y10S 206/814
See application file for complete search history.

(56) References Cited

U.S. PATENT DOCUMENTS

| | | | |
|---|---|---|---|
| 4,717,613 | A | 1/1988 | Ottaviano |
| 6,168,560 | B1 | 1/2001 | Pluymaekers et al. |
| 6,168,847 | B1 | 1/2001 | Murphy et al. |
| 6,174,273 | B1 | 1/2001 | Harding |

(Continued)

FOREIGN PATENT DOCUMENTS

WO WO 99/59807 A2 11/1999

OTHER PUBLICATIONS

International Search Report of International Application No. PCT/FR2017/053739 dated May 29, 2018, (and English Translation) 5 pages.

(Continued)

*Primary Examiner* — Yan Lan
(74) *Attorney, Agent, or Firm* — Lippes Mathias LLP

(57) ABSTRACT

A device for dispensing a cushioning and packaging element from at least one strip of paper includes at least two guides around which at least one strip of paper is wound. The device also includes at least one drive element for driving the at least one strip of paper. The device further includes at least one creasing device for creasing the at least one strip of paper. The guides extend beyond the at least one creasing device, downstream of the at least one creasing device.

8 Claims, 5 Drawing Sheets

(56) References Cited

U.S. PATENT DOCUMENTS

| | | |
|---|---|---|
| 6,421,985 B1 | 7/2002 | Simmons, Jr. et al. |
| 6,561,964 B1 | 5/2003 | Armington et al. |
| 6,626,812 B1 | 9/2003 | Harding et al. |
| 7,614,994 B2 | 11/2009 | Harding et al. |
| 7,740,573 B2 | 6/2010 | Manley |
| 8,920,299 B2 | 12/2014 | Keller |
| 9,688,044 B2 | 6/2017 | Deis et al. |
| 2004/0050743 A1 | 3/2004 | Slovencik et al. |
| 2004/0052988 A1* | 3/2004 | Slovencik .............. B65D 81/09 428/36.9 |
| 2008/0011749 A1 | 1/2008 | Cheich |
| 2009/0082187 A1 | 3/2009 | Cheich et al. |
| 2011/0053751 A1 | 3/2011 | Arora et al. |
| 2014/0162024 A1 | 6/2014 | Deis et al. |

OTHER PUBLICATIONS

International Preliminary Report on Patentability and Written Opinion of International Application No. PCT/FR2017/053739 dated May 29, 2018 (and English Translation) 14 pages.

* cited by examiner

DEVICE FOR DISPENSING A CUSHIONING AND PACKAGING ELEMENT, METHOD FOR PRODUCING THE ELEMENT, AND CUSHIONING ELEMENT AND CONSUMABLE USED TO PRODUCE SAID ELEMENT

BACKGROUND OF THE DISCLOSURE

This application is a continuation application of U.S. Ser. No. 16/472,061, which was filed on Jun. 20, 2019. That application, in turn, is the U.S. National Phase of PCT International Application No. PCT/FR2017/053739, filed on Dec. 20, 2017, which claims priority from French Application No. 1663234, filed on Dec. 22, 2016.

The present invention relates to a device for dispensing cushioning and packaging elements, its method of implementation, as well as the cushioning and packaging elements as such.

The presence of a cushioning element, protects and wraps the items to be packaged in a box. These wedges make it possible to fill the voids to wedge the objects inside a box and thus to absorb the shocks inherent to the transports and the possible falls.

Many types of cushioning solutions are present in the field of packaging. The general trend is to eliminate non-recyclable materials, and move towards recycled paper packaging.

The paper cushioning elements are creased in a coarse manner, resulting in acceptable but unsatisfactory mechanical properties.

SUMMARY OF THE DISCLOSURE

The present invention thus provides a dispensing device producing cushioning and packaging elements, to overcome the aforementioned drawbacks.

Thus, the dispensing device according to the invention of cushioning element and packaging from at least one strip of paper, comprises at least two guiding means around which at least one strip of paper is wound, at least one drive means and at least one means for creasing at least one strip of paper, while the guide means extend beyond, i.e. downstream, of at least one creasing means.

It should be added that the guide means are longitudinal profiles.

According to one embodiment, the dispensing device comprises a shaping means upstream of the guiding means, which allows the positioning of at least one strip of paper around said at least two guide means.

According to the previous embodiment, the shaping means is a closed path whose ends overlap According to another embodiment, the shaping means is in a closed path whose ends are located laterally on the same side, namely that the path is in a form of C.

According to the previous embodiments, the guide means are included in the interior space delimited by the path.

According to an additional feature, the dispensing device comprises means for inserting the paper web upstream of the shaping means.

According to the preceding feature, the insertion means is provided by a profile directed towards the outside, in the extension of the path.

According to one embodiment, the dispensing device comprises at least one positioning means for forcing at least a portion of at least one strip of paper between two guiding means.

According to the previous embodiment, the lower end of the positioning means is located or substantially located in correspondence of the lower ends of the guide means.

According to preferred embodiments, at least one drive means is located between two guide means, while at least one creasing means is located between two guiding means.

According to a complementary feature, the guide means comprise two parts of two different sections, the smallest section being located downstream of the larger section.

According to one embodiment, a drive means comprises a rear axle and a front axle downstream of the rear axle, both upstream of the creasing means.

The invention also relates to a method for producing a crimped paper wedging and packaging element comprising the steps of installing at least one paper web at the periphery of at least two guiding means, of positioning a portion of the paper web between the guiding means, moving the paper web along the guide means, and creasing the paper The present invention also relates to a cushioning and packaging element comprising at least one sheet of crumpled paper, forming at least two longitudinal ducts delimiting a connection zone, while the longitudinal ducts each comprise a continuous inner hollow body, corresponding to a longitudinal inner section defined by the inner ends of the folds located at the periphery of the longitudinal ducts.

It should be added that a hollow body has a constant or substantially constant section on all or substantially all of its longitudinal profile.

It should be noted that a hollow body is presented by a longitudinal section having a cross section selected from a circular, rectangular, square, oblong, triangular or hexagonal.

It should be noted that the connection zone consists only of at least two sheets of crumpled sheet at least longitudinally.

According to an additional characteristic, a consumable, intended for the production of a cushioning and packaging element according to the invention, is formed of a strip of paper folded in three sections, in which its lateral ends overlap, characterized in that the paper web comprises transverse perforation lines regularly distributed along its length.

According to the preceding feature the paper web is formed of a plurality of thicknesses.

BRIEF DESCRIPTION OF THE DRAWINGS

Other features and advantages of the invention will become apparent from the description which follows with reference to the accompanying drawings which are given by way of non-limiting examples.

FIG. 1 is a perspective view.

FIG. 2 is a sectional view along A-A.

FIG. 3 is a partial perspective view.

FIG. 4 is a sectional view along B-B of Figure Z

FIG. 5 is a sectional view along C-C of FIG. 2.

FIG. 6 is a perspective view of an insertion means located in the extension of a shaping means.

FIGS. 7 to 9 are perspective views illustrating the insertion of a paper web into the insertion means to the shaping means.

DETAILED DESCRIPTION OF THE DISCLOSURE

Figure 1:
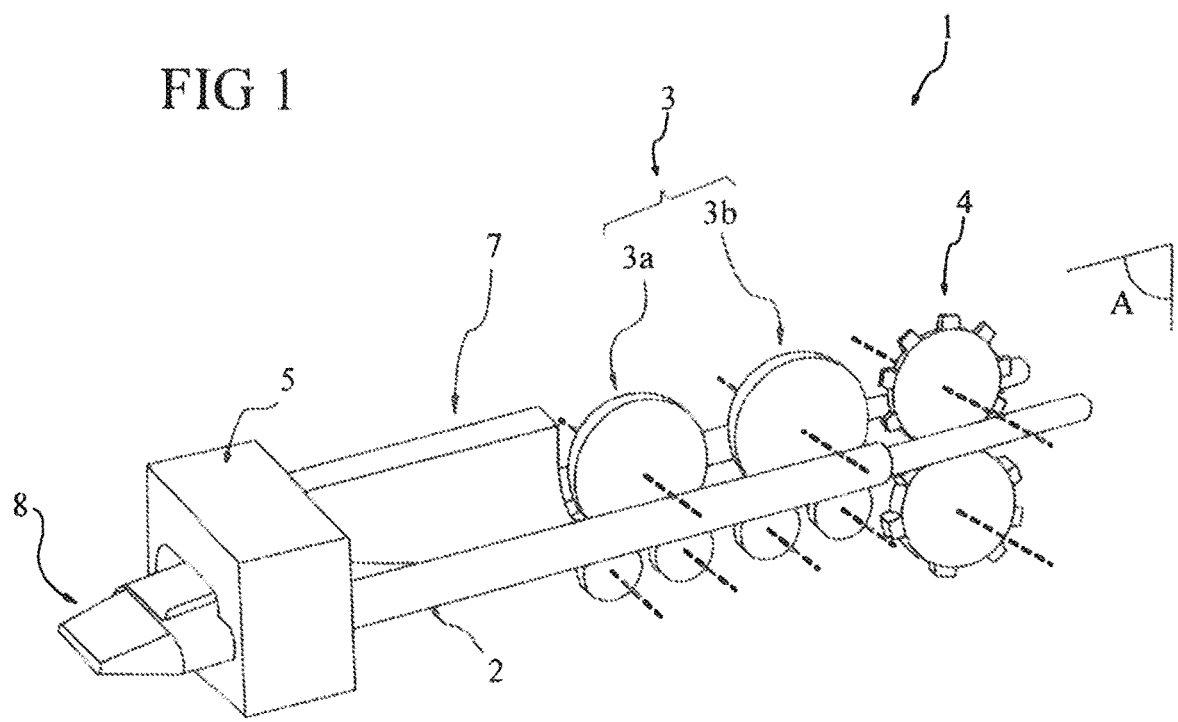
FIGS. 1 to 9 are views of a timing element and packaging device according to one embodiment of the invention.

This invention relates first of all to a dispensing device (1) for cushioning and packaging element (9) from at least one paper web (10).

The dispensing device (1) according to the invention comprises at least two guiding means (2) each having at least one independent free end, around at least one of which is wrapped at least one strip of paper (10), while it comprises a driving means (3) of at least one paper web (10), and at least one creasing means (4) of at least one paper web (10) downstream of the medium drive (3).

According to one characteristic, the guide means (2) have longitudinal profiles, all along which is wound at least one paper web (10).

According to the preceding characteristic, the guiding means (2) extend throughout the shaping of the cushioning and packaging elements (9) produced, that is to say that the guide means (2) extend from the outlet of the shaping means (5) to the wrinkling means (4), as explained in more detail in the following description.

The longitudinal profiles of the guiding means (2) may have any sectional shape, such as circular, rectangular, square, oblong, or even triangular or hexagonal, preferably circular as illustrated in particular in FIG. 1.

According to the preceding characteristic, the guide means (2) are oriented in the same direction in parallel manner.

According to the illustrated embodiment, the guiding means (2) comprise at least two parts (2a, 2b) having decreasing sections, namely a first portion (2a) upstream of a second portion (2b) having a smaller section than the first.

It should be noted that two guide means (2) define a central space in which is located at least one positioning means (7) of at least one strip of paper (10).

It should be noted that a positioning means (7) conforms to at least one paper web (10) in a central space, between two guide means (2).

More precisely, a positioning means (7) conforms to all the faces corresponding to this positioning means (7), that is at least two sides of at least one strip of paper (10) facing each other, preferably conforming the sections against each other.

According to one embodiment, at least one positioning means (7) conforms to at least one paper web (10) in the direction of a wrinkling means (4).

According to the illustrated embodiment, a positioning means (7) conforms to at least one paper web (10) towards a driving means (3) and then a creasing means (4), both located in a central space between two guide means (2), that is, a positioning means (7), a driving means (3) and a creasing means (4) are aligned along a central space.

According to the previous embodiment, the drive means (3) is located between the first portions (2a) of the guide means (2), while the creasing means (4) is arranged between the second portions (2b) of the guide means (2).

In other words, at least one positioning means (7) conforms at least one paper strip (10) upstream of the creasing means (4), preferably upstream of the driving means (3), advantageously such that at least one paper web (10) is wound substantially around the periphery of each of the guide means (2).

The positioning of the creasing means (4) at the second portions (2b) of the guiding means (2) makes it possible to obtain wrinkled areas having greater heights than if the wrinkling operation were performed on a longitudinal section having a constant section. These wrinkled areas have better compressive strength than if they were only partially wrinkled at the periphery of the ducts.

It should be noted that the creasing means (4) is advantageously a means which slows down or drives at least one paper web (10) at a speed lower than that of the drive means (3).

According to the illustrated embodiment a creasing means (4) is in the form of the association of two notched wheels whose respective notches of each of the wheels are offset, so that the wheels do not come into contact.

According to the previous embodiment, the notched wheels are mechanically connected and are driven by a single motor, which also prevents the wheels from coming into contact and damaging the device.

It should also be noted that the greater the difference in speed between a driving means (3) and a wrinkling means (4), the more the folds are concentrated. More pleats improve resistance to transverse compression.

According to the embodiment illustrated, a driving means (3) comprises a front axle (3b) and a rear axle (3a) each comprising a driving wheel provided with a pair of rolling bearings.

According to one characteristic, a drive wheel is brought into contact with the bearings associated with it by a vertical force exerted by springs.

According to the preceding characteristic, the panels of at least one strip of paper (10), namely at least two panels, are driven by the stressing between the drive wheels and the bearings, and the setting in motion of the front (3b) and rear (3a) trains.

The front axle (3b) is coupled to a motor, while the rear axle is coupled to the same motor via a clutch and/or braking means, such as a magnetic brake.

It should be noted that the front axle (3b) is located downstream of the rear axle (3a).

This operating mode of the driving means (3) makes it possible, when the rear axle is disengaged or braked, (3a) to cut a cushioning and packaging element (9) according to a length determined by the breaking of at least one strip of paper (10) along the precut zones.

According to the illustrated embodiment, the dispensing device (1) also comprises at least three detection cells, namely a first cell upstream of the rear axle (3a), a second cell between the two trains (3a, 3b), and a third cell between the front axle (3b) and the crumpling means (4). The presence of these detection cells makes it possible to determine the position of at least one strip of paper (10), to animate the motors, clutches and brakes according to the requests.

According to a particular embodiment, not shown, a driving means (3) and at least one creasing means (4) are respectively represented by a rear axle (3a) and a front axle (3b), wherein the nose gear (3b) is moved at a lower speed than the rear axle (3a).

According to one characteristic, the dispensing device (1) comprises a shaping means (5) of at least one paper web (10) around the outer periphery of at least two guiding means (2), upstream of these latter.

This shaping means (5) has an inlet and an outlet allowing at least one paper web (10) to wind around the guiding means (2).

According to the illustrated embodiment, the shaping means (5) comprises a passage of at least one paper web (10), which is provided by a closed path (6) which allows the winding of at least one web of paper (10) on itself, that is that the ends of a border of the path (6) advantageously overlap in offset manner.

According to another embodiment, the shaping means (5) is provided by a closed path (6) whose ends are located laterally on the same side, namely that the path (6) is in a crushed C shape.

It should be noted that the upstream ends of the guide means (2) are fixed or molded to the conformation means (5).

Figure 2:
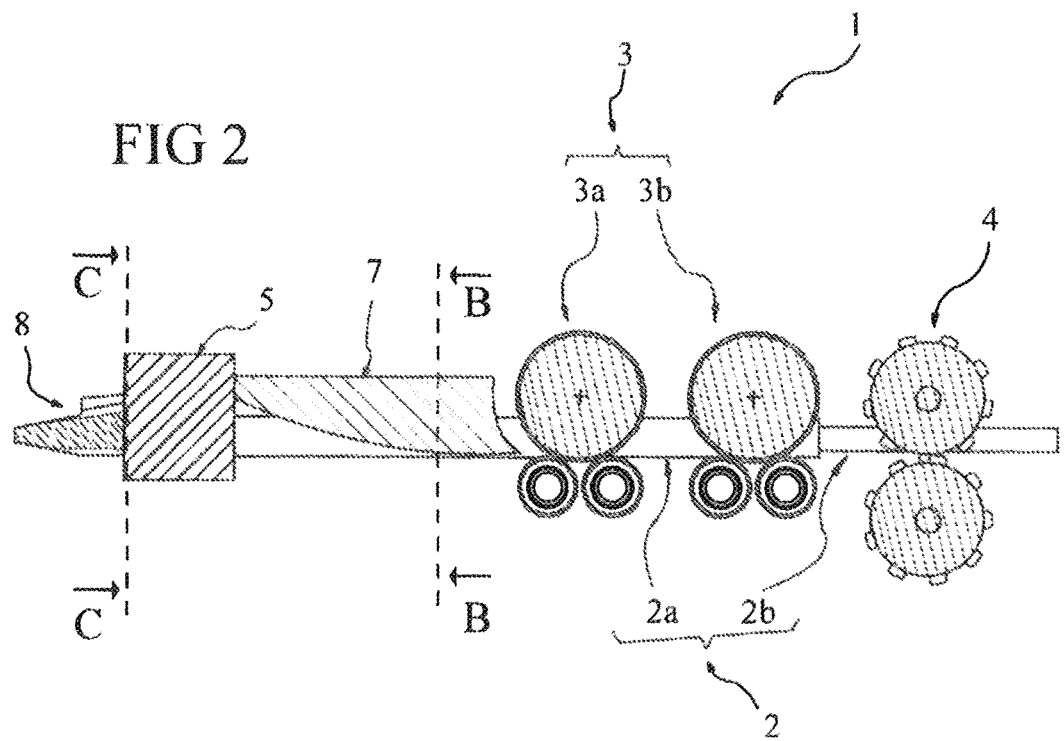
Figure 3:
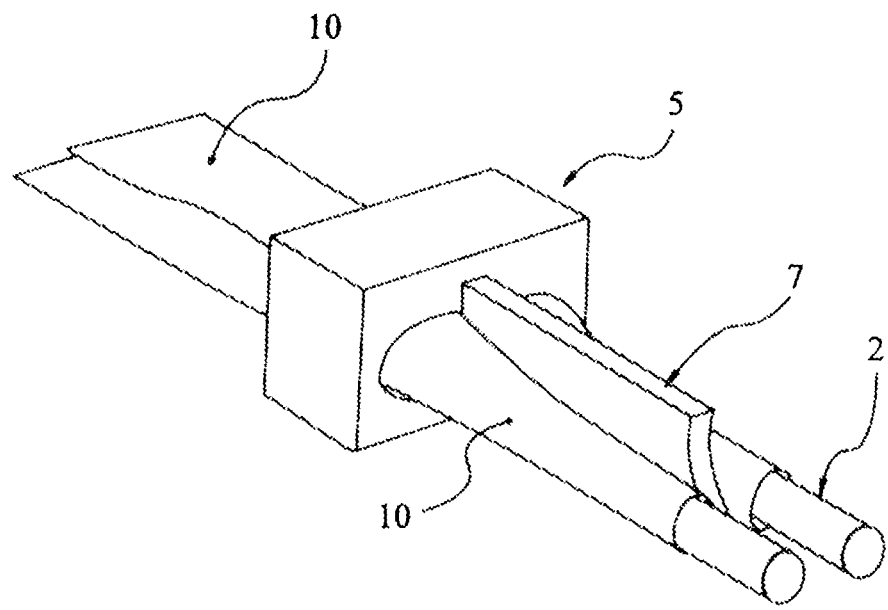
Figure 4:
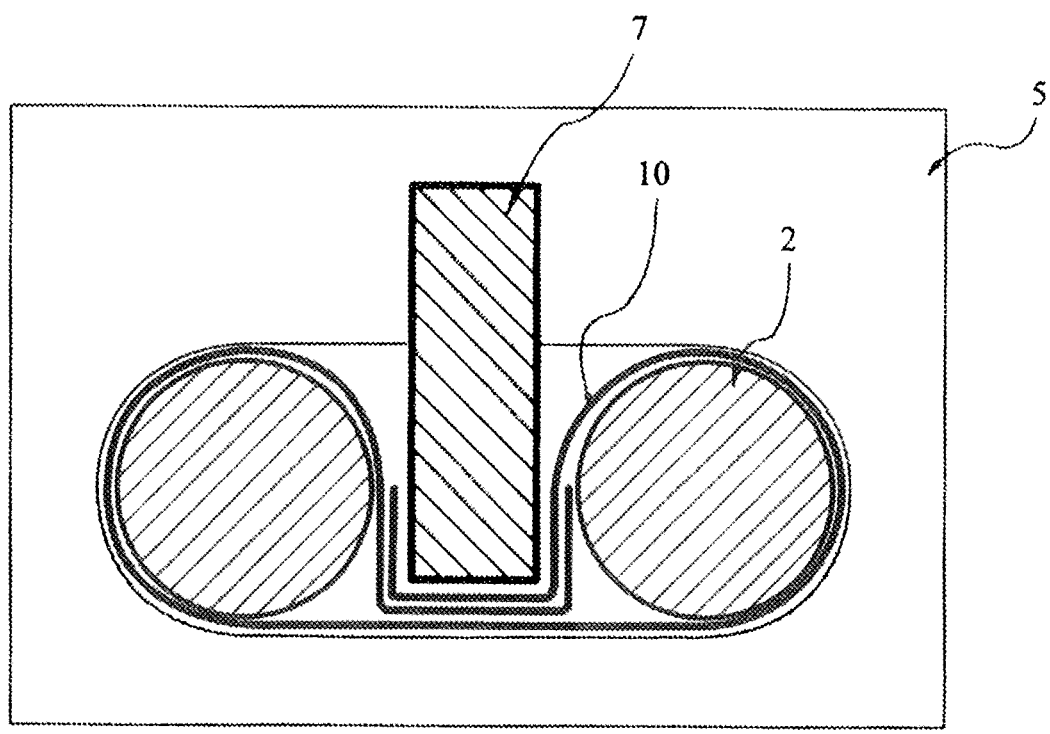
Figure 5:
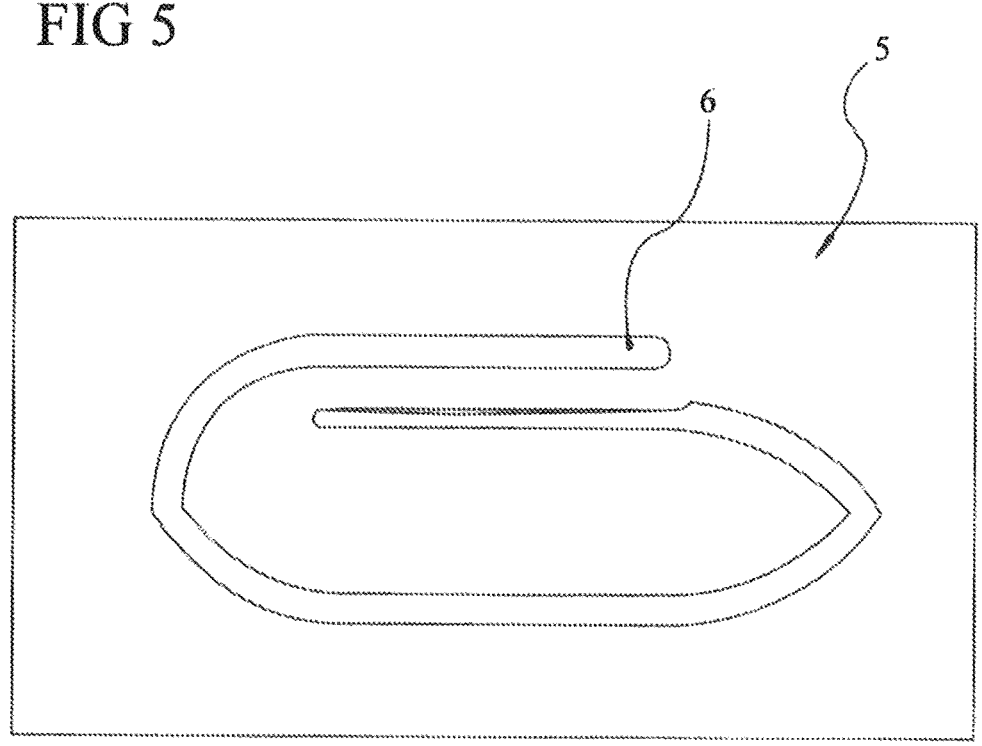

More precisely, as illustrated in FIG. 2, the upstream ends of the guiding means (2) are located inside the space arranged by the path (6) of the shaping means (5) of at least a strip of paper (10).

According to an additional characteristic, an insertion means (8) is added upstream of the shaping means (5), in order to facilitate the positioning of at least one paper web (10) in the latter, more specifically to facilitate the insertion of at least one paper web (10) into the path (6) of the shaping means (5), which in turn facilitates the positioning of at least one paper web (10) around the guide means (2).

Figure 6:
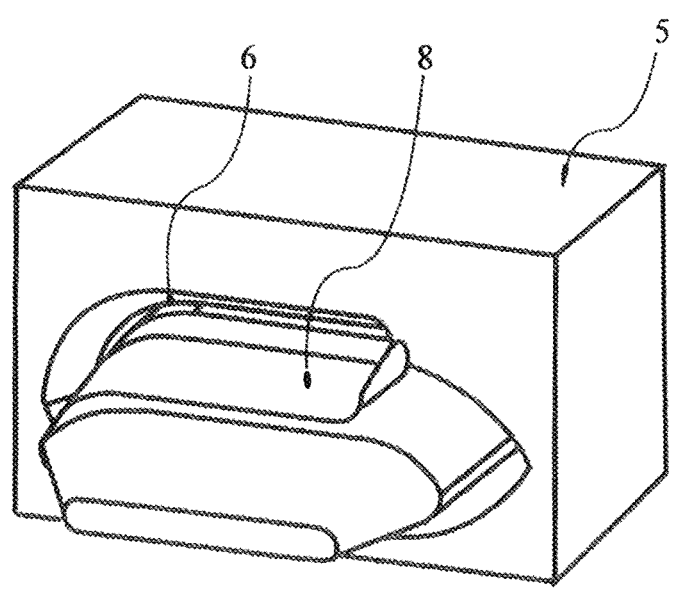

According to one embodiment, in particular illustrated in FIG. 6, the insertion means (8) is in the form of a ramp, which is an outward extension of the path (6) of the shaping means (5).

In other words, the insertion means (8) is an outwardly directed profile, in the extension of the path (6).

Figure 7:
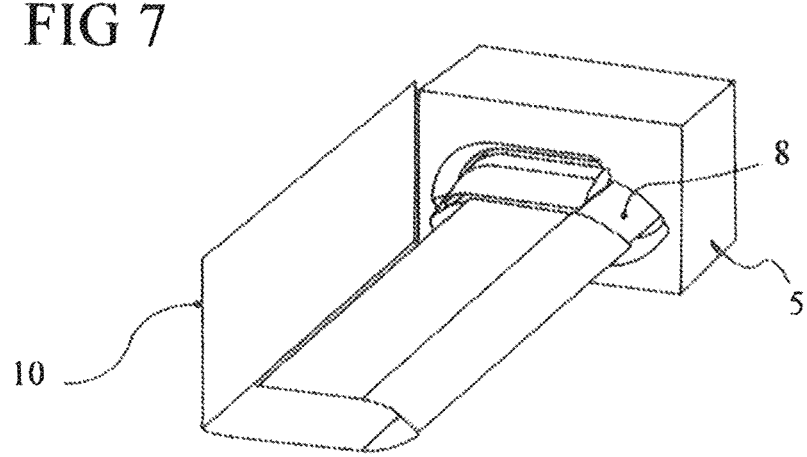
Figure 8:
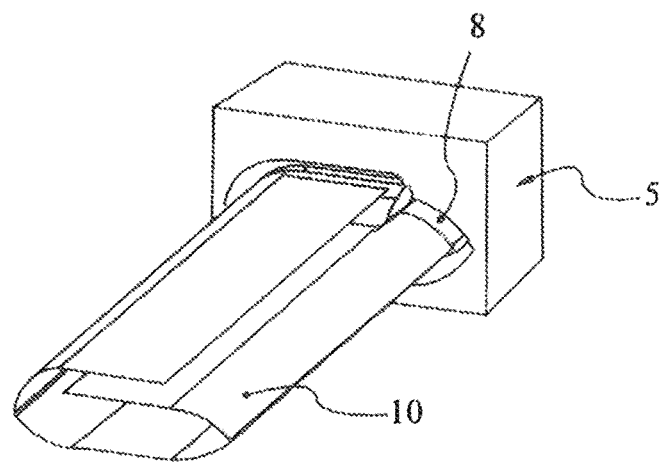
Figure 9:
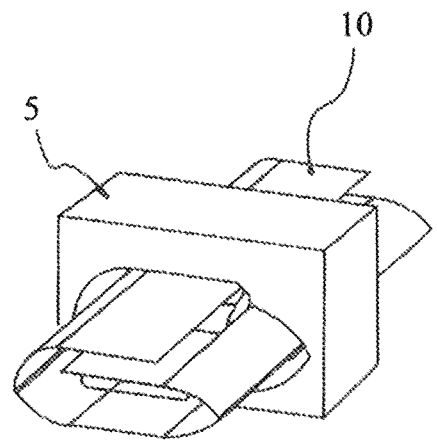

As illustrated in FIGS. 7 to 9, a side panel of the paper strip (10) is inserted opposite and abutting against the inner end of the path (6), more specifically is presented against the profile portion of the insertion means (8) arranged in the extension of the inner end of the path (6), while the other side panel of the paper web is engaged against the part of the profile of the insertion means (8) arranged in the extension of the outer end of the path (6), so as to easily insert the paper web in the conformation means (5).

A cushioning and packaging element (9) according to the invention is advantageously intended to be wound around at least a part of an article to be protected, which is previously or subsequently placed in a box. It is understood that a cushioning and packaging element (9) can also be arranged at the bottom and/or above the item (s) to be protected.

It should be noted that the cushioning element and packaging (9) according to the invention is made of crumpled paper and is provided by at least one connecting zone (12) defined by two longitudinal ducts (11).

It should be noted that the longitudinal ducts (11) have a general regular profile, the shape of which depends on that of the guide means (2) used.

It is understood that the longitudinal ducts (11) are creased at their peripheries, however their general profiles correspond to those of the guide means (2).

The fact that the longitudinal ducts (11) maintain a general regular profile, while being crumpled at their peripheries, makes it possible to obtain improved mechanical properties, in terms of resistance, in particular to radial compression, namely a direction perpendicular to the longitudinal direction of the cushioning element and packaging according to the invention.

It is understood by general regular profile a profile having a generally cylindrical, oblong, cuboid, or even triangular section, while being crumpled at its periphery.

Figure 10A:
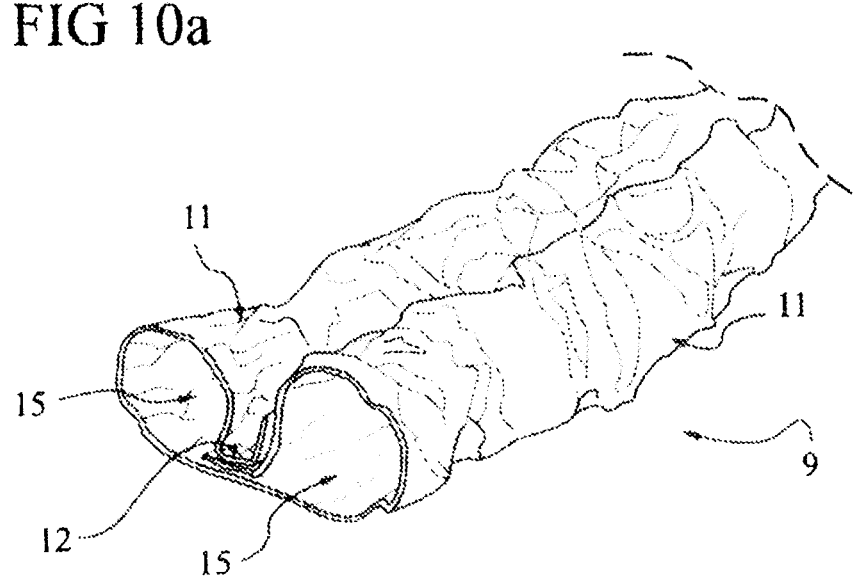
FIG. 10a is a perspective view of a cushioning element and packaging according to one embodiment of the invention.
Figure 10B:
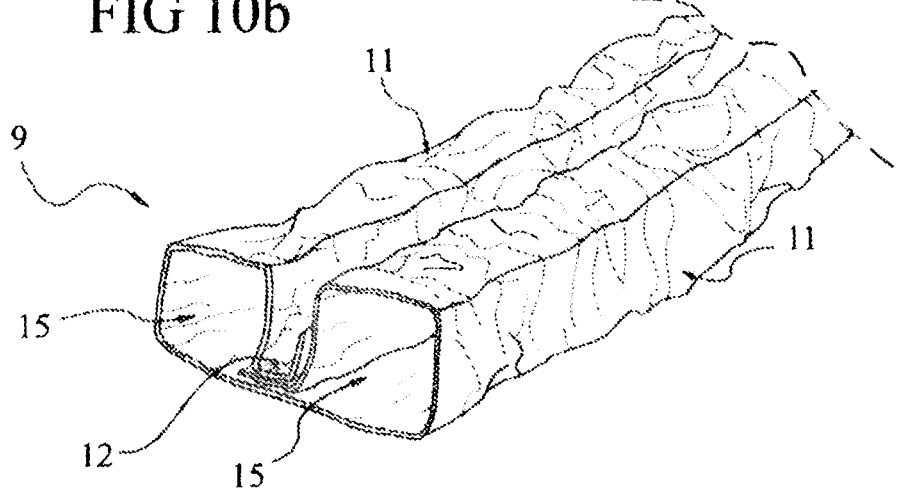
FIG. 10b is a perspective view of a cushioning element and packaging according to another embodiment of the invention.
Figure 11:
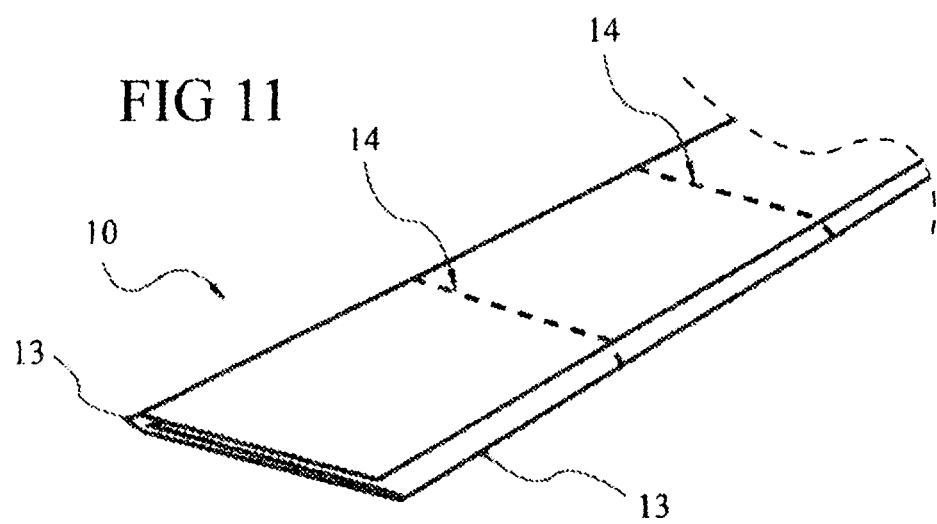
FIG. 11 is a perspective view of a consumable.

According to a complementary characteristic, as illustrated in FIGS. 10a and 10b, the longitudinal ducts (11) comprise a continuous hollow body (15) corresponding to the profiles of the second parts (2b) of the guide means (2), namely corresponding to an inner section delimited by the inner ends of the folds located at the periphery of the longitudinal ducts (11).

According to the preceding characteristic, a hollow body (15), namely an internal profile, a hollow body has a constant or substantially constant section on all or substantially all of its longitudinal section, equal to or substantially equal to that of a second portion (2b) of a guide means (2).

It should be noted that the profile of a hollow body (15) is included in that of the longitudinal duct (11) in which it is housed.

It should also be noted that a hollow body (15) is formed by a profile having a cross section of a shape chosen from circular, rectangular, square, oblong, triangular or hexagonal.

The presence of a hollow body (15) provides not only, for the same amount of paper, a larger volume to the resulting structure, but also provides reinforcement to the structure by means of a stress distribution vault along its periphery.

In order to obtain its definitive shape, a cushioning and packaging element (9) according to the invention advantageously does not include fastening means such as by perforation, gluing or by the use of staple, other than means for binding by creasing, along at least one connecting zone (12), at least one sheet of paper.

It should be noted that a cushioning and packaging element (9) consists of at least one sheet of paper, preferably consisting of a sheet of paper, wound on itself and creased at least longitudinally at least at a connecting zone (12).

It should be noted that a connecting zone (12) is only creased evenly along its longitudinal profile.

According to one characteristic, a connection zone (12) is more creased than the longitudinal ducts (11) which delimit it According to the preceding characteristic, the particular structure of a cushioning element according to the invention provides an improved resistance to radial crushing.

A connecting zone (12) constitutes a means for fixing at least two sections of a sheet, providing the sole means of maintaining the shape of at least one sheet of paper resulting in a cushioning and packaging element (9).

It should be noted It should be noted that a cushioning and wrapping element (9) is obtained from at least one wrapped paper web (10) in which at least two sections, preferably at least three sections of the strip, overlap and are creased in at least one longitudinal or substantially longitudinal connecting zone (12), even rectilinear or substantially rectilinear, while the crumpled paper web (10) is then cut into a sheet of crumpled paper at the desired length, preferably cut along transverse perforation lines.

Thus, according to one feature, a paper web (10) includes pre-cut areas, provided by transversally arranged perforation lines, which are evenly distributed along the length of the paper web (10).

In other words, a cushioning element (9) is present by at least one sheet of paper rolled up on itself and creased along at least one connecting zone (12) advantageously longitudinal or substantially longitudinal, or rectilinear or substantially rectilinear, wherein all sections of sheet wound in correspondence of at least one bonding zone (12) are creased within said bonding zone (12) so as to form on each side of at least one zone link (12), longitudinal ducts (11) whose general profiles are oriented in the general profile of the connecting zone (12).

It should also be noted that at least one connecting zone (12) is parallel or substantially parallel to the lateral ends of the cushioning and packaging element (9).

It is understood that since the paper is wrinkled, it is the general profile of a connection zone (12) that is parallel or substantially parallel to the lateral ends of the cushioning and packaging element (9).

It should also be noted that the longitudinal ducts (11) delimiting a connecting zone (12) are also parallel or substantially parallel to the latter and to the lateral ends of the cushioning and packaging element (9).

It is also understood that since the paper is wrinkled, it is the general profiles of the longitudinal ducts (11) that are parallel or substantially parallel to the general profile of the connection zone (12) and at the lateral ends of the cushioning and packaging element (9).

According to one characteristic, a sheet of wrinkled paper wound on itself comprises at least one connecting zone (12) of at least two panels, or even three sheets of sheet.

According to embodiments, a cushioning and packaging element (9) formed of at least two sheets of paper is obtained from the superposition of at least two paper strips (10) pre-folded or not.

By way of example, a cushioning and packaging element (9) may have two, three, four or five longitudinal ducts (11) adjacent to each other, oriented in the same direction, defined respectively by one, two, three or four parallel or substantially parallel connection zones (12), at least parallel (s) to the lateral ends of the cushioning element and packaging (9) according to the invention.

According to one characteristic, the longitudinal ends of the longitudinal ducts (11), namely the ends at which the paper strip (10) is cut, are open towards the outside.

According to an embodiment, not shown, the longitudinal ends of a cushioning and packaging element (9) are not wrinkled, at least not substantially wrinkled and delimit a wrinkled central zone in which the internal volume is greater than the longitudinal ends.

According to the illustrated embodiment, a cushioning and packaging element (9) according to the invention is obtained from at least one consumable which is in the form of a paper strip (10) pre-folded in three sections.

According to the previous embodiment, a cushioning and packaging element (9) formed of at least one sheet of wrinkled paper is obtained from at least one paper web (10) pre-folded by two longitudinal fold lines (13) delimiting three sections of sheet with side panels overlapping at least partially It should be noted that a strip of paper (10) is pre-folded so that its lateral ends are folded over the upper face of its central portion, so that they overlap.

In other words, the pre-folded paper web (10) is delimited into three sections, namely a central panel and two lateral panels, the outer ends of the side panels being adjacent, so that a first side panel is folded on the central panel, while the second side panel is folded on the first side panel.

According to one characteristic, the pre-folded paper web (10) comprises pre-cutting areas (14) evenly distributed along its length.

According to the previous characteristic, the pre-cutting areas (14) extend from one edge to the other of the pre-folded paper web (10), namely from each of the outer ends of the side panels.

The invention claimed is:

1. A cushioning and packaging element comprising at least one sheet of wrinkled paper, forming at least two longitudinal ducts delimiting a connection zone, wherein the longitudinal ducts each comprise a continuous interior hollow body, corresponding to a longitudinal inner section defined by inner ends of folds located at the periphery of the longitudinal ducts,
    wherein the longitudinal ducts are creased at their peripheries and creased at least longitudinally, resulting in sensibly perpendicular oriented folds, to obtain improved resistance to radial compression, namely a direction perpendicular to the longitudinal direction of the cushioning element, and
    wherein the hollow body is provided by a longitudinal section having a cross section selected from a circular, rectangular, square, oblong, triangular or hexagonal shape.

2. The cushioning and packaging element according to claim 1, wherein the hollow body has a constant or substantially constant section on all or substantially all of its longitudinal section.

3. The cushioning and packaging element according to claim 1, wherein longitudinal ends of the least two longitudinal ducts are open towards the outside.

4. The cushioning and packaging element according to claim 3, wherein the longitudinal ends of the at least two longitudinal ducts are not wrinkled, the longitudinal ends delimit a wrinkled central zone in which an internal volume is greater than an internal volume of one of the longitudinal ends.

5. The cushioning and packaging element according to claim 1, wherein the connection zone consists solely of at least two panels of wrinkled sheet at least longitudinally.

6. The cushioning and packaging element according to claim 1, wherein the connection zone is more creased than the longitudinal ducts.

7. A consumable for the production of cushioning and packaging elements according to claim 1, said consumable being formed of a paper strip folded into three sections, in which lateral ends of the paper strip overlap, wherein the paper strip comprises transverse perforation lines regularly distributed along its length.

8. The consumable according to claim 7, wherein the paper strip is formed of a plurality of thicknesses.

* * * * *